United States Patent [19]

Kenny et al.

[11] Patent Number: 5,744,757
[45] Date of Patent: *Apr. 28, 1998

[54] PLENUM CABLE

[75] Inventors: Robert D. Kenny, Oxford, Ohio; Douglas O'Brien, Richmond, Ind.

[73] Assignee: Belden Wire & Cable Company, Richmond, Ind.

[*] Notice: The term of this patent shall not extend beyond the expiration date of Pat. No. 5,514,837.

[21] Appl. No.: 642,489

[22] Filed: May 3, 1996

Related U.S. Application Data

[63] Continuation-in-part of Ser. No. 412,052, Mar. 28, 1995, Pat. No. 5,514,837.

[51] Int. Cl.$^6$ ................................. H01B 11/02
[52] U.S. Cl. ............... 174/113 R; 174/34; 174/110 PM; 174/121 A
[58] Field of Search ............... 174/36, 110 FC, 174/110 PM, 115, 121 A, 113 R, 34

[56] References Cited

U.S. PATENT DOCUMENTS

| | | | |
|---|---|---|---|
| 4,041,237 | 8/1977 | Stine et al. | 174/36 |
| 4,412,094 | 10/1983 | Dougherty et al. | 174/110 F |
| 4,500,748 | 2/1985 | Klein | 174/121 A |
| 4,686,294 | 8/1987 | Hoegerle et al. | 548/140 |
| 4,711,811 | 12/1987 | Randa | 428/383 |
| 4,744,629 | 5/1988 | Bertoglio et al. | 350/96.2 |
| 4,941,729 | 7/1990 | Hardin et al. | 350/96.23 |
| 4,963,609 | 10/1990 | Anderson et al. | 524/413 |
| 5,010,210 | 4/1991 | Sidi et al. | 174/34 |
| 5,162,609 | 10/1992 | Adriaenssens et al. | 174/34 |
| 5,202,946 | 4/1993 | Hardin et al. | 174/68.1 |
| 5,245,134 | 9/1993 | Vana, Jr. et al. | 174/117 F |
| 5,253,317 | 10/1993 | Allen et al. | 385/109 |
| 5,401,908 | 3/1995 | Rodeghero | 174/112 |
| 5,424,491 | 6/1995 | Walling et al. | 174/113 R |
| 5,493,071 | 2/1996 | Newmoyer | 174/113 R |
| 5,514,837 | 5/1996 | Kenny et al. | 174/113 R |
| 5,525,757 | 6/1996 | O'Brien | 174/121 A |

OTHER PUBLICATIONS

Wilkens, "Telephone Cable: Overview and Dielectric ChangesO", *IEEE Electrical Insulation Magazine*, pp. 23–28 Mar./Apr. 1990.

Glew, Halogen Versus Non–Halogen Materials for Telecommunications Wire & Cable, *Wire Technology International* Jul. 1994, pp. 64–67.

*Primary Examiner*—Kristine L. Kincaid
*Assistant Examiner*—Chau N. Nguyen
*Attorney, Agent, or Firm*—Laff, Whitesel, Conte & Saret, Ltd.

[57] ABSTRACT

A plenum cable having a plurality of twisted pair conductors enclosed by a jacket. A plurality of the twisted pair conductors has one insulating material thereon and at least one twisted pair conductor has a different insulation material thereon. In the preferred structure at least one twisted-pair conductor has flame retardant polyethylene or flame retardant polypropylene insulation and at least one other twisted pair conductor being insulated with fluorinated ethylene propylene, tetrafluoroethylene, or ethylenechlorotrifluoroethylene. The preferred twisted pair conductors have a center-to-center distance along any point of a 1000 ft. twisted pair conductor that is ±0.3 of an average center-to-center distance and/or have an impedance of 90 to 110 ohms and a variation of ±0.05 when measured at 10 MHz to 200 MHz from an average impedance and/or have their dielectric layers joined together along the length of the dielectric layers and having an adhesion strength between said dielectric layers of from about 0.1 to about 5 lbs. force.

7 Claims, 1 Drawing Sheet

PLENUM CABLE

This is a continuation-in-part of our application Ser. No. 08/412,052 filed Mar. 28, 1995, now U.S. Pat. No. 5,514,837.

FIELD OF THE INVENTION

This invention relates to plenum cables having a plurality of insulated conductors and at least one of the insulations is different. More particularly the present invention relates to plenum cables wherein there are a plurality of insulated conductors having at least two different flame retardant insulations. The cables are particularly suitable for use in high performance plenum cables meeting EIA/TIA category-5-type requirements.

BACKGROUND OF THE INVENTION

Plenum cables are generally used in buildings where fire codes require flame retardant cables. Typically plenum data cables have two or more pairs of insulated conductors in a common jacket. The insulation can be made of several types of flame retardant insulation. A typical and widely used flame retardant insulation for conductors in data plenum cables is fluorinated ethylene-propylene (FEP Teflon®). FEP Teflon® insulation is presently in short supply and is somewhat difficult to extrude. Thus, special extrusion equipment is needed to extrude FEP Teflon®.

Dielectric constant, also referred to as permittivity is the property of an insulation which determines the velocity at which electromagnetic signals propagate along the insulated conductor. A significant variation in dielectric constant between twisted pairs of a cable can result in the signals on different twisted pairs arriving at different times at the receiving end of the cable. This is often referred to as skew.

Due to problems with phase delay, skew and smoke and flame properties, all of the insulated conductors in the plenum cable have the same insulation.

SUMMARY OF THE INVENTION

The present invention is directed to providing a plenum cable which has other than non-foam and preferably other than foam FEP on at least one insulated conductor and therefore displaces the fluorinated ethylene-propylene on one or more plenum data cable insulated conductors and reduces the need for fluorinated ethylene-propylene insulation.

The present invention also provides a plenum cable having a plurality of twisted pair conductors surrounded by a jacket and at least one of the twisted pair conductors has a different insulation than another twisted pair conductor.

The present invention provides a plenum cable having a plurality of insulated pair conductors surrounded by a jacket. The twisted pair conductors in the plenum cable have at least two of the twisted pair conductors preferably with different insulations of foamed or non-foamed insulations selected from fluorinated ethylene propylene, tetrafluoroethylene, ethylenechloro-trifluoro ethylene, copolymers of tetrafluoroethylene with a perfluoroalkoxy, non-fluoronated polyolefins and flame retardant non-fluoronated polyolefin compositions. Preferably all of the insulated conductors have a dielectric constant within ±0.25 of each other and the twisted pair conductors have their insulations connected via a web along the length thereof.

It is an object of the present invention to provide a plenum cable having a plurality of twisted pair conductors wherein at least a first twisted pair conductor has a non-fluorinated insulation and at least a second twisted pair has a fluorinated insulation and said first and second twisted pair conductors have a dielectric constant within ±0.25 of each other.

It is still another object of the present invention to provide a plenum cable having a plurality of twisted pair conductors wherein at least a first twisted pair conductor has a non-plenum rated polyolefin insulation modified such that it is flame retardant and at least a second twisted pair conductor has insulation selected from fluoronated ethylene propylene, tetrafluoroethylene or ethylenechloro-trifluoroethylene or copolymers of tetrafluoroethylene with a perfluoroalkoxy.

It is still another object of the present invention to provide a plenum cable with at least two twisted pair conductors having a fluorinated insulation and at least one other twisted pair conductor having a non-fluorinated insulation, and a plurality of the twisted pair conductors have their insulation being joined together along the length of said dielectric layers. The conductors and corresponding dielectric layers are twisted substantially along the length of the twisted pair conductors to provide two fluorinated insulation twisted pair conductors with an impedance of about 90 to 110 ohms when measured over a 1000 ft. length at a frequency of about 10 MHz to about 200 MHz. The impedance is within a tolerance of an average impedance of no greater than ±0.05 times the average impedance. The average impedance being:

1. an average of at least one impedance measurement on each of at least twenty 1,000 ft. twisted parallel cables of the same size taken from the same run, or
2. an average of at least one impedance measurement from each of twenty randomly selected 1000 ft. twisted parallel cables of the same size, taken from three separate successive runs with each run being at least 24 hours apart from each other, or
3. an average impedance of at least 200 impedance measurements on one of twenty consecutive 1000 ft twisted pair conductors and the at least 200 impedance measurements being taken in less than 0.5 MHz increments.

These and other features of this invention will be best understood by reference to the following detailed description of the preferred embodiments of the invention taken in conjunction with the accompanying drawings.

DETAILED DESCRIPTION OF THE INVENTION

Figure 1:
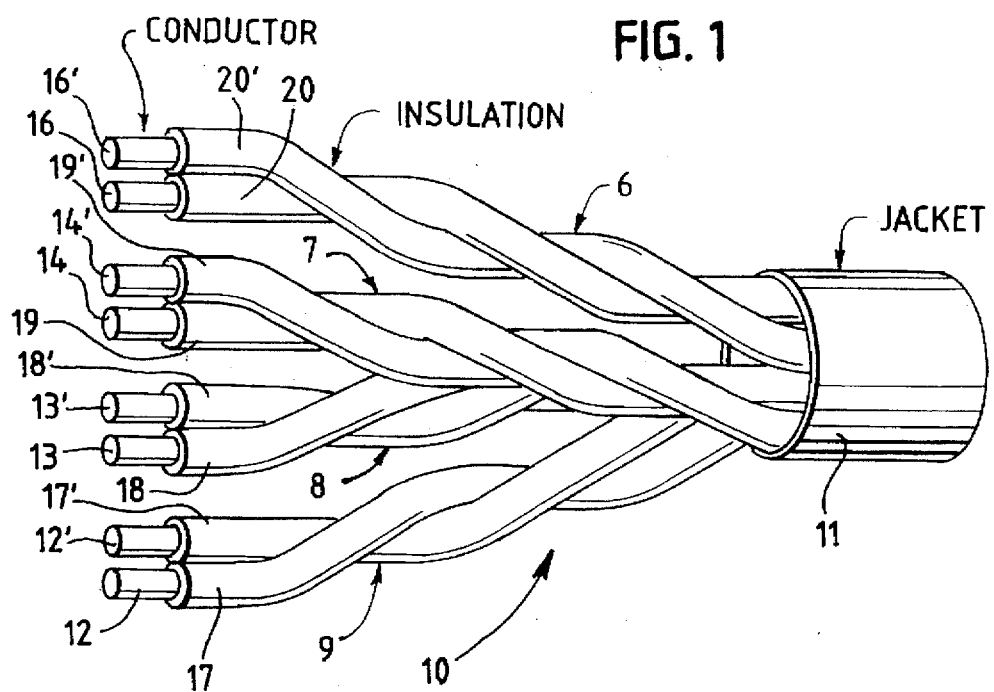
FIG. 1 shows a partial perspective view of a plenum cable of the present invention.

FIG. 1 illustrates a plenum cable 10 having a jacket 11 and four twisted pair conductors, 6, 7, 8, 9 and each having conductors 12, 12', 13, 13', 14, 14', 16, 16' which may be any suitable data transmission conductor and a dielectric insulation 17, 17', 18, 18', 19, 19' and 20, 20', covering the respective conductor.

The conductor insulation 17 and 17' is different than the conductor insulation 18 and 18'. The conductor insulation 19 and 19' and 20 and 20' may also be different. However, as a preferred embodiment the insulations 18, 18', 19, 19', 20 and 20' are all the same and conductor insulations 17 and 17' are different than 18 etc.

Each twisted pair 12-12', 13-13', 14-14', 16-16' preferably has substantially the same transmission delay from each other and varies 6% or by less than 30 nano seconds over a 100 meter length of the twisted pairs. The matching skew is achieved by the insulation and/or the amount of twist in each twisted pair.

When referring to FIG. 1, a typical plenum cable has more than four twisted pairs. With the plenum cable of FIG. 1, typical insulation formulations are as follows:

Dielectrics 17, 17', 18, 18' are the same and are one type of dielectric. These dielectrics are selected from non-foamed fluorinated polyolefins. The preferred non-foamed fluorinated polyolefins are selected from fluorinated ethylene propylene (FEP) tetrafluoroethylene (TFE), and ethylenechloro-trifluoroethylene and copolymers of tetrafluoroethylene with a perfluoroalkoxy. Examples of the copolymers are Ausemont's PFA and Ausemont's MFA.

Dielectrics 18, 18' are the same and are a second type of dielectric. This dielectric is selected from:

a. foamed fluorinated polyolefins with the preferred foamed fluorinated polyolefins being selected from fluorinated ethylene propylene (FEP), tetrafluoroethylene (TFE) and ethylenechloro-trifluoroethylene and copolymers of tetrafluoroethylene with perfluoroalkoxy, b. flame retardant non-fluorinated polyolefins.

Dielectrics 19 and 19' are the same and are either a third type of dielectric or the same as the first or second type of dielectric. Preferably this is the same as the first dielectric.

Dielectrics 20 and 20' are the same and are either a fourth type of dielectric or the same as the first, second or third electric.

A typical four twisted pair plenum cable would have dielectrics 17, 17', 18 and 18' formed of non-foamed fluorinated polyolefin and dielectric pairs 19, 19' and 20, 20' being both or one selected from foamed fluorinated polyolefin or non-fluorinated flame retardant polyolefin.

Figure 2:
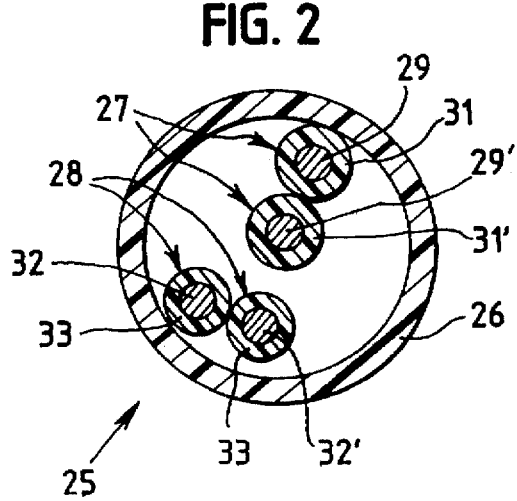
FIG. 2 shows a cross-sectional view of another plenum cable according to the present invention.

Referring to FIG. 2, there is a plenum cable 25 having a jacket 26 and two twisted-pair conductors 27 and 28. The twisted-pair conductor 27 has two conductors 29, 29' respectively being covered with insulations or dielectrics 31, 31'. The twisted-pair conductor 28 has two conductors 32, 32' respectively being covered with insulations 33, 33'.

The insulations 31, 31' are both the same and the insulations 33, 33' are both the same. The dielectric constant or propagation delay is determined for each of the twisted pairs.

The insulations 31, 31' are indicated as slightly foamed and the insulations 33, 33' are non-foamed insulations.

The insulations 31, 31' are preferably the non-fluorinated insulations. Preferably, these are polyolefin based compositions. The preferred compositions for the plenum cable 25 is foamed and non-foamed polyolefins selected from flame retardant polyethylene and flame retardant polypropylene.

The insulations 33, 33' are preferably the fluorinated insulations. Preferably these are foamed and non-foamed fluorinated polyolefins commonly used for plenum cable insulations and are selected from fluorinated ethylene propylene (FEP) tetrafluoroethylene (TFE), ethylenechlorotrifluoroethylene and copolymers of tetrafluoroethylene with a perfluoroalkoxy.

The conductor insulation of each pair may be of different material, i.e. insulation 31 may be a non-foamed non-fluorinated flame retardant polyolefin and 31' may be a foamed non-fluorinated flame retardant polyolefin and insulation 31 be a non-foamed or foamed fluorinated polyolefin; or the various combinations with insulations 33 and 31'.

This configuration is also possible for insulations 17 and 17', 18 and 18', 19 and 19' and 20 and 21'. However, it is preferable that the insulation 17 and 17' etc. of each twisted pair is made of the same material to more readily provide the desired dielectric constant and performance.

Because the insulations of the twisted pairs that do not have the same insulations would normally have differing dielectric constants, this difference in propagation delay between the twisted pairs could hinder performance of systems utilizing the cable. Foamed flame retardant polyolefin insulation will match the propagation delays of the fluorinated polyolefin insulation to less than 30 nanoseconds per 100 meters and insure system performance.

The foamed fluorinated or non-fluorinated flame retardant polyolefins are foams which have void space of 10 to 18% and are sometimes referred to as "partially foamed" insulations.

We have generally defined two of the insulations as flame retardant polyethylene and flame retardant polypropylene. These, of course, embody many of the known flame retardant polyethylene and polypropylene compositions. The flame retardant polyethylene may be the flame retardant polyethylene disclosed in U.S. Pat. No. 5,358,991 or any other known flame retardant polyethylene for plenum cables.

The jackets 11 and 26 are made from any acceptable jacket material used for plenum cables. Some of the most widely used compositions are an extruded polyvinyl chloride, fluorinated ethylene propylene, tetrafluoroethylene and Flammarrest®.

The insulation compositions of the twisted-pairs in many instances combine with each other and with the jacket compositions to provide effective flame and smoke control.

The polyolefin blend is preferably a mixture of polypropylene, very low density polyethylene and either one of or both of high density polyethylene and low density polyethylene.

The polypropylene resin provides structural strength and crush resistance to the flame retardant polyolefin composition. The amount of polypropylene present in the polyolefin composition used to form the insulation is from about 50 to about 85 parts by weight of polypropylene per hundred parts by weight of the polyolefin blend used. An example of a suitable polypropylene is PP7382 GE7 which is manufactured by Exxon and which has a density of 0.90 g/cc and melt flow rate of 4 g/10 min.

The very low density resin provides impact and low temperature performance. A preferred very low density resin is very low density polyethylene (VLDPE). VLDPE has a nominal density of below 0.910 g/cc and preferably in the range of 0.880 to 0.910 g/cc. The amount of very low density polyethylene present in the polyolefin composition is from about 10 to about 40 parts by weight VLDPE per hundred parts by weight of the polyolefin blend. An example of a very low density polyethylene is Exact 3022 made by Exxon and which has a melting point of 94° C., a density of 0.905 g/cc and a melt index (MI) of 9 g/10 min.

The polyolefin blend may also include a high and/or low density polyethylene in an amount of from about 5 to about 20 parts by weight per hundred parts by weight of the polyolefin blend. The low density polyethylene (LDPE) has a nominal density in the range of 0.910 to 0.925 g/cc. The high density polyethylene (HDPE) has a nominal density in the range of 0.941 to 0.965 g/cc. The high density polyethylene used as an example in my invention is Union Carbide's DGDL 3364 (previously DGDK 3364) which has a density at 23° C. of 0.945 g/cc, and an MI of 0.75 g/10 min.

The low density polyethylene used as an example in my invention is Union Carbide DFDA 6005 which has a density of 0.920 g/cc, an MI of 0.2 g/10 min., and a peak melting point of about 106° C.

The overall melt flow of the polyolefin blend is typically around 3.5 to 4.9 g/10 min under ASTM D1238 standards, i.e. at 230° C. and a force of 2.16 Kg. This provides milder extrusion pressure and smoother flow in the die.

The specific gravity of the polyolefin blend is about 0.918.

The polyolefin composition contains a flame retardant added to the polyolefin blend. The flame retardant is generally a mixture of halogen flame retardant chemicals, non-halogen flame retardant chemicals and a flame retardant intumescent composition. The flame retardant mixture generally contains from about 6 to about 20 parts by weight of halogen flame retardant per hundred parts by weight of the polyolefin blend and from about 20 to about 60 parts by weight of non-halogen flame retardant per hundred parts by weight of the polyolefin blend.

The preferred halogenated flame retardant is a chlorinated cyclooctene such as chlorinated dimethanodibenzocyclooctene. The specific compound is Dechlorane +35 which is dodecachloro-dodecahydro-dimethanodibenzocyclooctene. The chlorinated cyclooctene has a particle size of no greater than 12 microns. The halogenated flame retardant may also be selected from chlorinated wax, bromochloro wax, etc.

Dechlorane +35 is used in the polyolefin composition in an amount of from about 5 to about 15 parts by weight per hundred parts by weight of the polyolefin blend. Dechlorane +35 has a melting point of 350° C. and is made by Occidental Chemicals.

The non-halogenated flame retardant may be selected from one or more of the following compounds zinc borate, aluminum trihydrate, magnesium hydroxide, zinc stannate, magnesium stearate, ammonium octamolybdate and zinc stearate.

The preferred non-halogen flame retardant is a mixture of a first non-halogen flame retardant, a second non-halogen flame retardant and a flame retardant intumescent.

The first non-halogen flame retardant is selected from one or more of zinc borate, zinc stearate, magnesium stearate, ammonium octamolybdate and zinc stannate. The preferred first non-halogen flame retardant is zinc borate. Zinc borate in the polyolefin composition is used in an amount of from about 12 to about 36 parts per by weight of zinc borate per hundred parts by weight of the polyolefin blend and is preferably about 24 parts by weight per hundred parts by weight of the polyolefin blend. In the preferred embodiment, ZB-467 Lite by Climax is used. This is a non-hygroscopic free-flowing powder having an average particle size of 1.5 microns, a water solubility of 0.1 g/100 ml, a specific gravity of 2.74 and a refractive index of 1.59. Climax has indicated that the formula is $4.ZnO.6.B_2O_3.7H_2O$.

The second non-halogen flame retardant is selected from one or more of magnesium hydroxide and magnesium stearate. The preferred second non-halogen flame retardant is FR-20 MHRM 105 which is magnesium hydroxide coated with 2% stearic acid.

The stearic acid coated magnesium hydroxide was obtained from Ameribrom under the tradename FR-20 MHRM-120. This is used in an amount of 8 to 24 parts by weight per hundred parts by weight of the polyolefin blend.

The flame retardant intumescent composition is a silicone polymer dispersed on a fumed silica. The preferred silicone composition used is Dow Corning's 4-7081 resin modifier which has been described as a silicone powder which has both vinyl and acrylate functionality. This is used in an amount of from about 4 to about 12 parts by weight per hundred parts by weight of the polyolefin blend.

The stabilizer in the polyolefin composition provides protection from degradation. A typical composition contains one or more hindered phenolic stabilizers and may have a secondary stabilizer. The hindered phenolic stabilizers are used in an amount of from 0.2 to 2.0 parts by weight per hundred parts by weight of the polyolefin blend. The primary hindered phenolic stabilizer in the polyolefin composition is used in an amount of from about 0.15 to about 0.5 parts by weight per hundred parts by weight of the polyolefin blend and is preferably about 0.15 parts by weight. An example of a primary stabilizer is Irganox 1010 made by Ciba Geigy. Ciba Geigy has indicated that this is tetrakis [methylene (3,5-di-tert-butyl-4 hydroxyhydrocinnamate)] methane. Likewise, the secondary hindered phenolic stabilizer is present in the polyolefin composition in an amount of from about 0.1 to about 0.5 parts by weight per hundred parts by weight of the polyolefin blend and is preferably about 0.25 parts by weight per hundred parts by weight of the polyolefin blend. An example of a secondary hindered phenolic stabilizer is Irganox MD 1024 by Ciba Geigy which has been described as having the formula 1,2-bis (3,5-di-tert-butyl-4 hydroxyhydrocinnamate) hydrazine.

Additional stabilizers are calcium stearate and Chemisorb 944 each used in an amount of about 0.05 to about 0.2 parts by weight per hundred parts by weight of the polyolefin blend and preferably about 0.10 parts by weight. The calcium stearate was purchased from Witco Chemical Company; Chicago, Ill. The Chemisorb 944, which is a polypropylene stabilizer, was purchased from Ciba Geigy.

The following Example illustrates the current insulation formulation of the inventive composition.

EXAMPLE

| Material | Mfg | Type | Parts by Weight | Ranges |
| --- | --- | --- | --- | --- |
| PP7382 | Exxon | PP | 70 | 50 to 85 |
| Exact 3022 | Exxon | VLDPE | 20 | 10 to 40 |
| DGDL 3364 | Union Carbide | HDPE | 10 | 5 to 20 |
| Dechlorane +35 | Occidental | Chlorinated | 12 | 6 to 20 |
| 4-7081 | Dow Corning | FR Intumescent | 7.8 | 4 to 12 |
| ZB-67 lite | Climax | FR Non-Halogen | 24 | 12 to 36 |
| FR-20 MHRM 105 | Ameribrom | FR Non-Halogen | 12 | 8 to 24 |
| Irganox 1010 | Ciba Geigy | Hindered Phenolic | 0.15 | .1 to .5 |
| Irganox MD 1024 | Ciba Geigy | Stabilizer | 0.25 | .1 to .5 |
| Calcium Stearate | Witco | Stabilizer | 0.10 | .05 to .2 |
| Chemisorb 944 | Ciba Geigy | Stabilizer | 0.10 | .05 to .2 |

The compounding of the above materials is preferably processed at a temperature of 160° C. to 180° C. Likewise, the above materials are preferably extruded at temperatures between 175° C. to 210° C. onto conductors to prepare the insulated conductors. The plenum cable and twisted pairs are prepared by known procedures.

Each of the twisted pair insulated conductors is preferably prepared by extruding insulation over two wires simultaneously and then adhering the two insulated conductors via bonding, webbing, or other suitable means. The adjoined insulated conductors are twisted to produce the desired number of twists per paired wire cable length.

Figure 3:
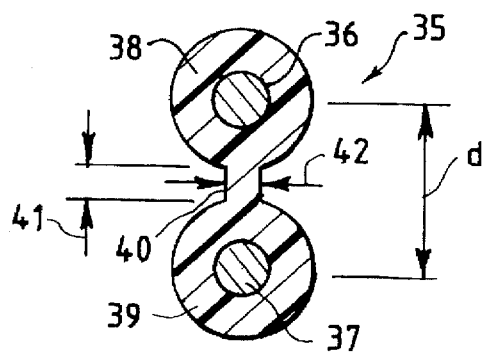
FIG. 3 is an enlarged cross-sectional view taken of one of the twisted-pair conductors used in the present invention.

The twisted pairs 6, 7, 8, 9, 27 and 28 preferably have the construction noted in FIG. 3. FIG. 3 illustrates a twisted pair 35 having two solid, stranded or hollow conductor wires 36 and 37. The conductors are solid metal, a plurality of metal strands, an appropriate fiber glass conductor, a layered metal or combination thereof. Each conductor 36 and 37 is surrounded by a respective dielectric or insulating cylindrical layer 38 and 39. Each of the conductors 36 and 37 is disposed centrally within the corresponding insulation 38 and 39. The conductors may, if desired, adhere to any degree against the inner walls of the insulation by any suitable means, such as by bonding, by heat or adhesives.

The insulations 38 and 39 are preferably integral with each other and are joined together along their lengths in any suitable manner. As shown, the joining means is a solid integral web 40 which extends from the diametric axis of each insulation. The width 41 of the web is in the range of from about 0.00025 to about 0.150 inches. The thickness 42 of the web is also in the range of from about 0.00025 to about 0.150 inches.

The diameter (traditionally expressed in AWG size) of each of the conductors 36 and 37 are preferably between about 18 to about 40 AWG.

The conductors 36 and 37 may be constructed of any suitable material, solid or strands, of copper, metal coated substrate, silver, aluminum, steel, alloys or a combination thereof. The thickness of each dielectric layer or insulation 38 and 39 is in the range of from about 0.00025 to about 0.150 inches.

The twisted pair 35 can be bonded together by an appropriate adhesive or the adjacent dielectrics can be bonded together by causing material contact while the dielectrics are at elevated temperatures and then cooling.

The bonding or web 40 are such that the dielectric layers can be separated and remain intact with an adhesion strength of not more than 5 lbs. force.

Any number of twisted pair cables may be incorporated into an overall jacketed or unjacketed cable with an optional metallic shield under the encasement, or applied over each twisted pair.

The twisted pair conductors of FIGS. 1–3 provide for relatively error free transmissions within most frequencies utilized by LAN systems.

One way to measure the amount of structural variation in a cable is by sending a signal along the transmission line (cable path) and measuring the amount of energy reflected back towards the testing apparatus. Sometimes the reflected electrical energy peaks at particular frequencies (often referred to as "spikes" within the cable industry). This is the result of a cylindrical variation in the construction which matches the cyclical wave (or frequency) propagating down the cable. The more energy reflected back, the less energy is available at the other end of the cable.

The actual reflected energy can be predicted by the impedance stability of the transmission line. If a 100 ohm impedance signal is sent down the cable, any part of the cable which is not exactly 100 ohms will cause a reflection. One of the features of the twisted pair conductor 35 is that it has a center-to-center distance d measured in a plane perpendicular to the longitudinal centers of the twisted pair conductor 35 and between the centers of adjacent conductors is ±0.03 times the average of d with the variation being not any more than this.

To measure the variation of d in our twisted pair cables, we randomly select at least three and preferably twenty 1000 ft. samples of cable of the same size from at least three separate successive runs with each of the runs occurring on a separate day or 24 hour period. The average of d is calculated by taking at least 20 measurements on each 1000 ft. cable with each measurement taken at least 20 ft. apart and dividing by the total number of measurements taken. All of the d measurements for our cable fall within the tolerances of ±0.03 times the average of d.

For example, in one of our typical 24 AWG cables not produced in conformance with the present invention and having a dielectric layer with a center to center conductor spacing of 0.035 inches, the average of d in inches for three 1000 ft. lengths of cable with 20 measurements taken in at least 20 ft. intervals is:

| Sample | Cable 1 (d) | Cable 2 (d) | Cable 3 (d) |
| --- | --- | --- | --- |
| 1 | .0355 | .0364 | .0344 |
| 2 | .0352 | .0368 | .0340 |
| 3 | .0358 | .0364 | .0341 |
| 4 | .0353 | .0357 | .0346 |
| 5 | .0348 | .0352 | .0344 |
| 6 | .0340 | .0356 | .0348 |
| 7 | .0347 | .0356 | .0352 |
| 8 | .0349 | .0359 | .0345 |
| 9 | .0355 | .0367 | .0341 |
| 10 | .0362 | .0362 | .0347 |

-continued

| Sample | Cable 1 (d) | Cable 2 (d) | Cable 3 (d) |
| --- | --- | --- | --- |
| 11 | .0367 | .0366 | .0352 |
| 12 | .0363 | .0363 | .0350 |
| 13 | .0354 | 0356 | .0356 |
| 14 | .0348 | .0347 | .0354 |
| 15 | .0345 | .0355 | .0351 |
| 16 | .0344 | .0352 | .0345 |
| 17 | .0351 | .0359 | .0344 |
| 18 | .0356 | .0363 | .0341 |
| 19 | .0351 | .0366 | .0336 |
| 20 | .0347 | .0368 | .0335 |
| TOTAL | .7045 | .7194 | .6912 |
| Cable Totals 1 + 2 + 3 divided by 60 | | .0353 | |

Since in the above example, the cables expose a measurement outside the tolerance of the average of d (center to center conductor spacing) ±0.03 times the average of d, the cable would be rejected. In this case, the range of acceptable d is from 0.0342 to 0.0364 inches, i.e., 0.0353 (the average) ±0.0011 (0.03×0.0353). Since in the above example there are measurements outside this tolerance in each of the runs, the twisted pairs in all of these runs would be rejected.

An alternative and/or combined feature of our twisted pairs is that each have an impedance of from 90 to 110 ohms when measured at frequencies of about 10 MHz to about 200 MHz with a tolerance of about ±5%±0.05% times the average impedance. The average impedance is calculated by taking impedance measurements between about 10 MHz to about 200 MHz on random samplings of 1000 ft. twisted pair conductors of the same size with at least one impedance measurement on each of at least twenty (20) random samples of 1000 ft. twisted pair taken from the same run. Another average impedance which would be acceptable would be taking at least one impedance measurement on at least twenty randomly selected 1000 ft. twisted pairs of the same size taken from three separate successive runs on at least three separate days. The 1000 ft. twisted pairs are rated for an impedance of about 90 to about 110 ohms when measured at a frequency of between 10 MHz and 200 MHz. As noted above, the acceptable 1000 ft. twisted pair will have an impedance at any frequency between 10 MHz and 200 MHz that varies no greater than ±0.05 times the average impedance. For example, if the average impedance is 96.2, no impedance measurement between 10 MHz and 200 MHz can be greater than 101.0 ohms (96.2+4.8[96.2×0.05]) or less than 91.4 ohms (96.2−4.8[96.2×0.05]).

Another average impedance used in the present invention is calculated by taking at least 200 impedance measurements of one of twenty consecutive 1000 ft twisted pair conductors with the at least 200 impedance measurements being taken in less than 0.5 MHz increments.

If any of the impedance measurement between 10 and 200 MHz vary by more than or less than 0.05 times the average impedance in the one cable than the cable run is not acceptable.

The average impedance is calculated in the usual manner i.e. adding all of the impedance measurements and dividing the total by the number of impedance measurements.

Further, the adhesion strength of the twisted pair is such that the individual insulated conductors may be pulled apart after an initial cut by finger nail or appropriate tool by hand with the same or less pull that is needed to remove a normal band aid from a scratch.

The pulling apart of the twist pairs for at least an inch, leaves the insulation substantially intact over the separated portion and does not disturb the twist. This adhesion feature permits the insulated conductors of a twisted pair to be separated without causing the twist to unravel and separate.

The adhesion strength is determined by holding one insulated conductor and pulling the other insulated conductor. The adhesion strength of the twisted pair 35 that substantially leaves the insulation 38 and 39 substantially intact is between 0.1 and 5 lbs. force and preferably between 0.25 and 2.5 lbs. force.

Although FIG. 1 shows a plenum cable having four insulated twisted pair insulated conductors enclosed by a jacket, any number of twisted pairs may be used. Also, any known additional construction for the plenum cable, i.e., filler, shielding, etc., is considered as a part of this disclosure.

The mixture of insulations used in the plenum cables of our invention allow the manufacturer to have flexibility as to production and cost from current supplied of materials available and to substantially maintain uniformity in the plenum cables provided.

The foregoing is for purposes of illustration rather than limitation of the scope of protection accorded this invention. The latter is to be measured by the following claims, which should be interpreted as broadly as the invention permits.

The invention claimed is:

1. A plenum cable having a jacket enclosing a plurality of twisted pair conductors comprising:
    at least one twisted pair conductor has an insulation dielectric layer selected from the group consisting of flame retardant polyethylene and flame retardant polypropylene and
    at least two twisted pair conductors having insulation dielectric layers selected from the group consisting of fluorinated ethylene propylene, tetrafluoroethylene, and ethylenechloro-trifluoroethylene and copolymers of tetrafluoroethylene with a perfluoroalkoxy, and
    at least one of the twisted pair conductors being joined together along the length thereof and having a center-to-center distance at any point along the twisted pair conductor that does not vary by more than ±0.03 of an average center-to-center distance, said average center-to-center distance being an average of at least 20 center-to-center distance measurements on each of at least three randomly selected 1000 ft. twisted pair conductors of the same size taken from at least three separate successive runs with each run being on a separate day.

2. A plenum cable having a jacket enclosing a plurality of twisted pair conductors comprising:
    at least one conductor has a dielectric layer different than a dielectric layer of another conductor,
    at least one twisted pair conductor having a dielectric layer surrounding each conductor,
    said dielectric layers of said at least one twisted pair conductor being joined together along the length of said dielectrics, said conductors and corresponding dielectric layers being twisted substantially along the length of said cable to provide the twisted pair conductor,
    said at least one twisted pair conductor having a center-to-center distance at any point along the twisted parallel conductor that does not vary by more than ±0.03 of an average center-to-center distance, said average center-to-center distance being an average of at least 20 center-to-center distance measurements on each of at least three randomly selected 1,000 ft. twisted pair conductors of the same size taken from the same run with each of said measurements being taken at least 20 feet apart.

3. The plenum cable of claim 1 wherein there are at least two twisted pair conductors each having dielectric layers joined together by a webbing extending substantially along the length of each of said at least two twisted pair conductors.

4. The plenum cable of claim 2 wherein there are at least two twisted pair conductors each having dielectric layers joined together by a webbing extending substantially along the length of each of said at least two twisted pair conductors.

5. The plenum cable of claim 2 wherein each of said conductors has a diameter of from about 18 to about 40 AWG and each dielectric has a thickness in the range of about 0.00025 to about 0.150 inches.

6. A plenum cable having a jacket enclosing a plurality of twisted pair conductors: comprising:
    at least one conductor has an insulation different than another conductor,
    at least two of said plurality of twisted pair conductors each have a dielectric layer surrounding each conductor, said dielectric layers in each pair of said at least two twisted pair conductors being joined together along the length of said dielectric layers, said conductors and corresponding dielectric layers of said at least two twisted pair conductors being twisted substantially along the length of said cable to provide the at least two twisted pair conductors each having over any 1000 ft., an impedance of about 90 to 110 ohms when measured at a frequency of about 10 MHz to about 200 MHz;
    said impedance being within a tolerance of an average impedance of no greater than ±0.05 times said average impedance, said average impedance being:
        a. an average of at least one impedance measurement on each of at least twenty 1,000 ft. twisted pair conductors of the same size taken from the same run, or
        b. an average of at least one impedance measurement from each of twenty randomly selected 1000 ft. twisted pair conductors of the same size, taken from three separate successive runs with each of said runs being at least 24 hours apart from each other, or
        c. selecting one twisted pair conductor from twenty consecutive 1000 ft. twisted pair conductors and taking at least 200 impedance measurements on said one twisted pair conductor with said at least 200 impedance measurements being measured at between 10 MHz and 200 MHz taken in less than 0.5 MHz increments.

7. The plenum cable of claim 6 wherein each of said twisted pair conductors has a center-to-center distance at any point along the twisted pair conductor that does not vary by more than ±0.03 of an average center-to-center distance with said average center-to-center distance being an average of at least 20 center-to-center distance measurements on each of at least three randomly selected 1,000 ft. twisted pair conductors of the same size taken from the same run with each of said measurements being taken at least 20 feet apart.

* * * * *